(12) United States Patent
Yasuda

(10) Patent No.: US 7,570,298 B2
(45) Date of Patent: Aug. 4, 2009

(54) IMAGE-TAKING APPARATUS WITH FIRST FOCUS CONTROL SUCH THAT IN-FOCUS POSITION IS SEARCHED FOR BASED ON FIRST SIGNAL AND SECOND FOCUS CONTROL SUCH THAT ONE OF IN-FOCUS POSITION AND DRIVE AMOUNT IS DETERMINED BASED ON SECOND SIGNAL

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 10/909,404

(22) Filed: Aug. 3, 2004

(65) Prior Publication Data

US 2005/0052563 A1 Mar. 10, 2005

(30) Foreign Application Priority Data

Sep. 9, 2003 (JP) .............................. 2003-317340

(51) Int. Cl.
*H04N 5/232* (2006.01)
*G03B 13/00* (2006.01)
*G03B 3/00* (2006.01)

(52) U.S. Cl. ..................... 348/345; 348/350; 396/102

(58) Field of Classification Search ................ 348/345, 348/348, 349, 350, 353; 396/102
See application file for complete search history.

(56) References Cited

U.S. PATENT DOCUMENTS 5,335,072 A * 8/1994 Tanaka et al. ............ 348/231.3
6,222,588 B1 * 4/2001 Yamazaki et al. ........... 348/355
6,700,618 B1 * 3/2004 Chubachi .................... 348/354
2003/0081137 A1 * 5/2003 Yamazaki .................... 348/354
2004/0095504 A1   5/2004 Yasuda ........................ 348/345

FOREIGN PATENT DOCUMENTS

JP          5-64056          3/1993
JP       2000-292681      * 10/2000

* cited by examiner

*Primary Examiner*—Sinh Tran
*Assistant Examiner*—Albert H Cutler
(74) *Attorney, Agent, or Firm*—Fitzpatrick, Cella, Harper & Scinto (57) ABSTRACT

An image-taking apparatus which reduces occurrence of unnatural focus changes is disclosed. The image-taking apparatus includes a first detector which outputs a first signal representing a focus state of an image-taking optical system based on a predetermined-frequency component of an output signal of the image-pickup device and a second detector which outputs a second signal different from the first signal. The image-taking apparatus also includes has a controller which performs a first focus control for controlling drive of the focus lens based on the first signal and a second focus control for controlling drive of the focus lens based on the second signal. The controller performs the second focus control in a case where an in-focus state cannot be achieved with the first focus control.

5 Claims, 12 Drawing Sheets

IMAGE-TAKING APPARATUS WITH FIRST FOCUS CONTROL SUCH THAT IN-FOCUS POSITION IS SEARCHED FOR BASED ON FIRST SIGNAL AND SECOND FOCUS CONTROL SUCH THAT ONE OF IN-FOCUS POSITION AND DRIVE AMOUNT IS DETERMINED BASED ON SECOND SIGNAL

BACKGROUND OF THE INVENTION

1. Field of the Invention

The present invention relates to an image-taking apparatus such as a video camera.

2. Description of the Related Art

For auto-focus control of a video camera, a so-called TV-AF method is predominantly used to perform control in which an object image is photoelectrically converted by an image-pickup device into a video signal, the sharpness of the video is detected in the video signal and is used as an AF evaluation value, and the position of a focus lens at which the AF evaluation value is at the peak is searched for.

Figure 2:
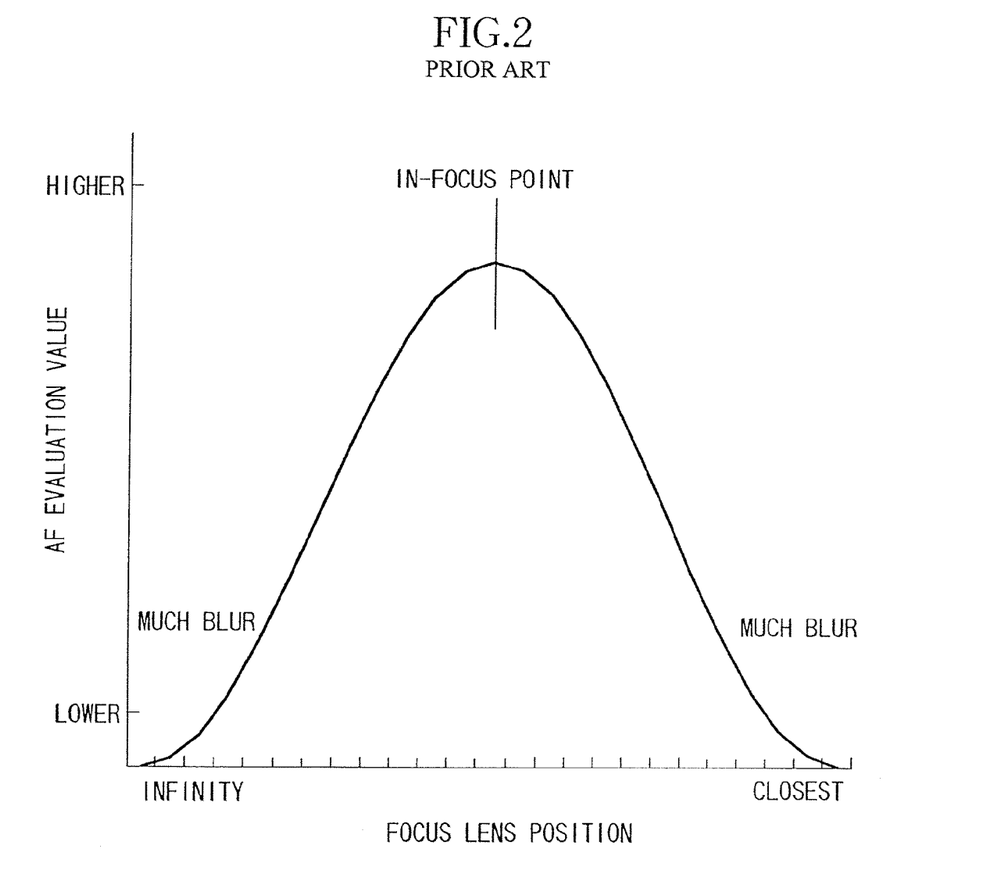
FIG. 2 is a graph showing the relationship between an AF evaluation value and the position of a focus lens unit.

As the AF evaluation value in the TV-AF method, a high-frequency component extracted from a video signal by a band pass filter for a certain band is typically used. When a normal object image is taken, the AF evaluation value is higher as a focus lens approaches an in-focus point (in-focus position) as shown in FIG. 2, and the highest level of the AF evaluation value corresponds to the in-focus point.

Another AF method is a TTL (Through The Lens) phase difference detection method. In the TTL phase difference detection method, a luminous flux passing through an exit pupil of an image-taking lens is divided into two which are received by a set of line sensors. Then, a displacement amount in signals output in accordance with the received light amounts, that is, a relative positional displacement amount in the direction in which the luminous flux is divided, is detected to directly determine a defocus amount of the image-taking lens. Thus, once a focus detection sensor is used to perform storage operation, the amount and direction of driving of a focus lens can be provided to allow focus adjustment operation at high speed.

In addition, the phase difference detection method includes an external metering phase difference detection type which does not use light passing through an image-taking lens. In the external metering phase difference detection method, a luminous flux from an object is divided into two which are received by a set of line sensors. Then, a displacement amount in signals output in accordance with the received light amounts, that is, a relative positional displacement amount in the direction in which the luminous flux is divided, is detected to determine the distance to the object with triangulation.

Other AF methods using an external metering sensor include a method in which an ultrasonic sensor is used to measure the distance to an object from the propagation speed of ultrasonic waves, a method in which an infrared sensor is used to perform triangulation, and the like.

In addition, a hybrid AF method is used by combining these AF schemes. In the hybrid AF method, for example, a focus lens is driven to a position close to an in-focus point with the TTL phase difference detection method, and then the focus lens is driven more accurately to the in-focus position with the TV-AF method (for example, see Japanese Patent Application Laid-Open No. 5-64056 (No. 1993-64056).

The aforementioned hybrid AF method, however, has the following disadvantage. Specifically, in the hybrid AF method, the final AF control is performed in the TV-AF method since the TV-AF method generally enables a more accurate search for an in-focal position. Conversely, the AF methods other than the TV-AF method provide lower focusing accuracy than the TV-AF method.

For this reason, when the focus lens is driven in an AF method other than the TV-AF method, the focus lens may pass the in-focus position at which the focus lens would stop in the TV-AF method. Thus, a video being taken involves unnatural focus changes in which focusing is once achieved, then slight blurring is caused, and thereafter, focusing is being achieved again by auto-focus in the TV-AF method.

SUMMARY OF THE INVENTION

It is an object of the present invention to provide an image-taking apparatus and a focus control method which allow occurrence of unnatural focus changes as mentioned above to be minimized, and a processing program which is performed in the image-taking apparatus or which performs the focus control method.

According to one aspect, the present invention provides an image-taking apparatus comprising an image-pickup device which photoelectrically converts an object image formed by an image-taking optical system including a focus lens, a first detector which outputs a first signal representing a focus state of the image-taking optical system based on a predetermined-frequency component of an output signal of the image-pickup device, a second detector which outputs a second signal different from the first signal, and a controller which performs a first focus control for controlling drive of the focus lens such that an in-focus position of the focus lens is searched for based on the first signal and a second focus control for controlling drive of the focus lens such that one of an in-focus position and a drive amount of the focus lens is determined based on the second signal. The controller performs the second focus control in a case where an in-focus state cannot be achieved with the first focus control.

The cases where the in-focus state cannot be achieved includes the case where an in-focus position cannot be specified (determined) finally even after the in-focus position is searched for, the case where focusing determination is not made, the case where a search cannot be made, and the like.

According to another aspect, the present invention provides a method of focus control and a processing program for an image-taking apparatus including an image-pickup device which photoelectrically converts an object image formed by an image-taking optical system including a focus lens, the method and the processing program comprising, a step of producing a first signal representing a focus state of the image-taking optical system based on a predetermined-frequency component of an output signal of the image-pickup device, a step of producing a second signal different from the first signal, a first focusing step of performing a first focus control for controlling drive of the focus lens such that an in-focus position of the focus lens is searched for based on the first signal, and a second focusing step of performing a second focus control for controlling drive of the focus lens such that one of an in-focus position and a drive amount of the focus lens is determined based on the second signal. The second focusing step is performed in a case where an in-focus state cannot be achieved with the first focusing step.

According to a further aspect, the present invention provides an image-taking apparatus comprising an image-pickup device which photoelectrically converts an object image formed by an image-taking optical system including a focus lens, a first detector which outputs a first signal representing a focus state of the image-taking optical system based on a predetermined-frequency component of an output signal of the image-pickup device, a second detector which outputs a second signal different from the first signal, and a controller which performs a first focus control for controlling drive of the focus lens such that an in-focus position of the focus lens is searched for based on the first signal and a second focus control for controlling drive of the focus lens such that one of an in-focus position and a drive amount of the focus lens is determined based on the second signal. The controller selects the first focus control when a value of the first signal is larger than a predetermined value and selects the second focus control in a case where the value of the first signal is smaller than the predetermined value, and in a case where the second focus control is selected, the controller changes the predetermined value into a value smaller than that at the time of the selection of the second focus control.

According to a still further aspect, the present invention provides a method of focus control for an image-taking apparatus including an image-pickup device which photoelectrically converts an object image formed by an image-taking optical system including a focus lens, the method comprising a step of producing a first signal representing a focus state of the image-taking optical system based on a predetermined-frequency component of an output signal of the image-pickup device, a step of producing a second signal different from the first signal, a first focusing step of performing a first focus control for controlling drive of the focus lens such that an in-focus position of the focus lens is searched for based on the first signal, a second focusing step of performing a second focus control for controlling drive of the focus lens such that one of an in-focus position and a drive amount of the focus lens is determined based on the second signal, a step of selecting a first focusing step in a case where a value of the first signal is larger than a predetermined value and selecting the second focusing step in a case where the value of the first signal is smaller than the predetermined value, and a step of changing the predetermined value into a value smaller than that at the time of the selection of the second focusing step in a case where the second focusing step is selected.

These and other characteristics of the image-taking apparatus, the focus control method, and the processing program will be apparent from the following description of specific embodiments with reference to the drawings.

DETAILED DESCRIPTION OF THE PREFERRED EMBODIMENTS

Embodiments of the present invention are hereinafter described with reference to the drawings.

Embodiment 1

Figure 1:
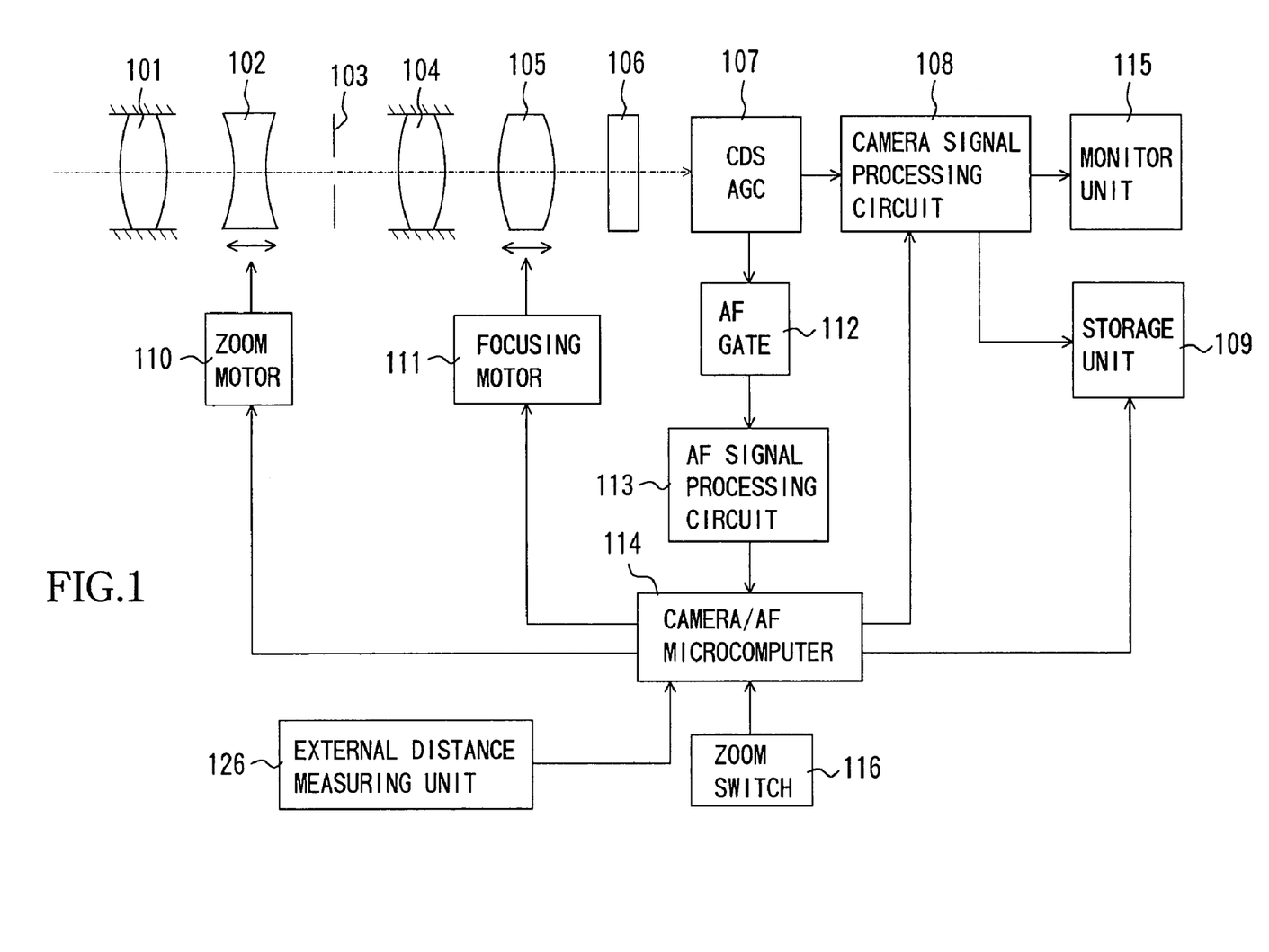
FIG. 1 is a block diagram showing the structure of a video camera which is Embodiment 1 of the present invention.

FIG. 1 shows the structure of a video camera (an image-taking apparatus) which is Embodiment 1 of the present invention. While Embodiment 1 is described in connection with the video camera which has an incorporated image-taking lens, the present invention is applicable to a video camera on which an image-taking lens is removably mounted. In such a case, a camera/AF microcomputer, later described, produces a control signal which is communicated to a microcomputer in the image-taking lens such that the camera/AF microcomputer controls drive of a focus lens unit through the lens microcomputer. In addition, while Embodiment 1 is described for the video camera, the present invention is applicable to various types of image-taking apparatuses such as a digital still camera. This also applies to Embodiment 2, later described.

In FIG. 1, reference numeral 101 shows a first fixed lens unit, reference numeral 102 shows a lens unit (hereinafter referred to as a zoom lens unit) which provides variable magnification, reference numeral 103 shows a stop, reference numeral 104 shows a second fixed lens unit, and reference numeral 105 shows a lens unit (hereinafter referred to as a focus lens unit) which has both of a focus adjusting function and a so-called compensator function of correcting movements of an image surface due to varied magnification. An image-taking optical system constituted by these lens units is a rear focus optical system formed of the four lens units having a positive, a negative, a positive, a positive optical powers in order from an object side (the left side in FIG. 1). It should be noted that, while each lens unit is shown as it is formed of a single lens, each lens unit may actually be formed of a single lens or a plurality of lenses.

The zoom lens unit 102 and the focus lens unit 105 are driven by a zoom motor 110 and a focusing motor 111, respectively, in an optical axis direction (the left-to-right direction in FIG. 1).

Incident light from an object passes. through the lens units and the stop 101 to 105, and images on an image-pickup device 106. The image-pickup device 106 is a photoelectrical conversion element such as a CCD sensor and a CMOS sensor which converts the object image formed on an image-pickup surface into an electric signal. The electric signal output from the image-pickup device 106 is sampled by a CDS/AGC circuit 107 for gain adjustment and then input to a camera signal processing circuit 108.

The camera signal processing circuit 108 performs predetermined processing on the signal input from the CDS/AGC circuit 107 to produce a video signal appropriate for record and display in a storage unit 109 and on a monitor unit 115, respectively. The storage unit 109 records the video signal input thereto on a recording medium (such as a magnetic tape, an optical disc, and a semiconductor memory). The monitor unit 115 displays a video of the object on a display such as an electronic viewfinder and a liquid crystal panel based on the video signal input thereto.

On the other hand, the video signal output from the CDS/AGC circuit 107 is also input to an AF gate 112. The AF gate 112 selects a signal component associated with the area of a display screen for use in focus control out of the video signal corresponding to the whole screen and outputs the selected signal component to an AF signal processing circuit (a first detector) 113. The area of the screen for use in focus control can be set arbitrarily, and a plurality of areas may be set.

The AF signal processing circuit 113 extracts an AF evaluation value signal (a focus evaluation signal) such as a high-frequency component for use in focus control with the TV-AF method and a luminance difference component produced from the high-frequency signal component (a difference between the maximum and minimum in luminance level of the video signal) out of the input video signal, and outputs the extracted signal to a camera/AF microcomputer 114. The AF evaluation value signal represents the sharpness of the video based on the output signal from the image-pickup device 106. Since the sharpness changes with the focus state of the image-taking optical system, the AF evaluation value signal therefore represents the focus state of the image-taking optical system.

The camera/AF microcomputer 114 outputs a control signal to the focusing motor 111 to drive the focus lens unit 105 in small amounts in order to search for the position (an in-focus position) of the focus lens unit 105 at which the AF evaluation value is at the maximum level (at the maximum value or a value close thereto). This control method is the so-called TV-AF method (first focus control).

The camera/AF microcomputer 114 is responsible for control of the entire video camera. The output from the aforementioned AF signal processing circuit 113 and an output from an external distance measuring unit (a second detector) 126, later described, are input to the camera/AF microcomputer 114 and used in calculations for AF control. The camera/AF microcomputer 114 outputs the control signal to the aforementioned focusing motor 111 in accordance with the calculation result to drive the focus lens unit 105.

The external distance measuring unit 126 is a sensor of an external metering type, specifically, a type in which the distance to an object is measured without using light passing through the image-taking optical system (the image-taking lens) and a signal based on the distance is output. A distance sensor of a passive type can be used as the external distance measuring unit 126. In distance measurement of the passive type, a luminous flux from an object is divided into two which are received by a set of line sensors. Then, a displacement amount in signals output in accordance with the received light amounts, that is, a relative positional displacement amount in the direction in which the luminous flux is divided, is detected to determine the distance to the object with triangulation.

In addition to the distance measurement of the passive type, distance measurement of an active type includes a method in which an ultrasonic sensor is used to determine the distance to an object from the measured propagation speed of ultrasonic waves and a triangulation method often used in a compact camera in which infrared rays applied to an object are used. However, the distance detector (the second detector) in the present invention is not limited to these distance measurement methods.

The camera/AF microcomputer 114 calculates a position (a control value) of the focus lens unit 105 to achieve focusing based on the information about the distance to the object detected or measured with the detection signal from the external distance measuring unit 126 and information about the focal length of the image-taking optical system (which can be provided from an output from a position sensor, not shown, for detecting the position of the zoom lens unit 102 or a drive pulse count of the zoom motor 110 from a reference position), or reads the position (the control value) from table data, to drive the focus lens unit 105 to that position.

It should be noted that the camera/AF microcomputer 114 may determine a drive amount (a control value) for driving the focus lens unit 105 to the in-focus position. The control method is herein referred to as an external metering distance detection method (second focus control).

Next, detailed description is made for the AF control performed by the camera/AF microcomputer 114 in accordance with a processing program with reference to FIGS. 3A, 3B to FIG. 7. First, the general AF operation is described with reference to FIGS. 3A and 3B.

Figure 3A:
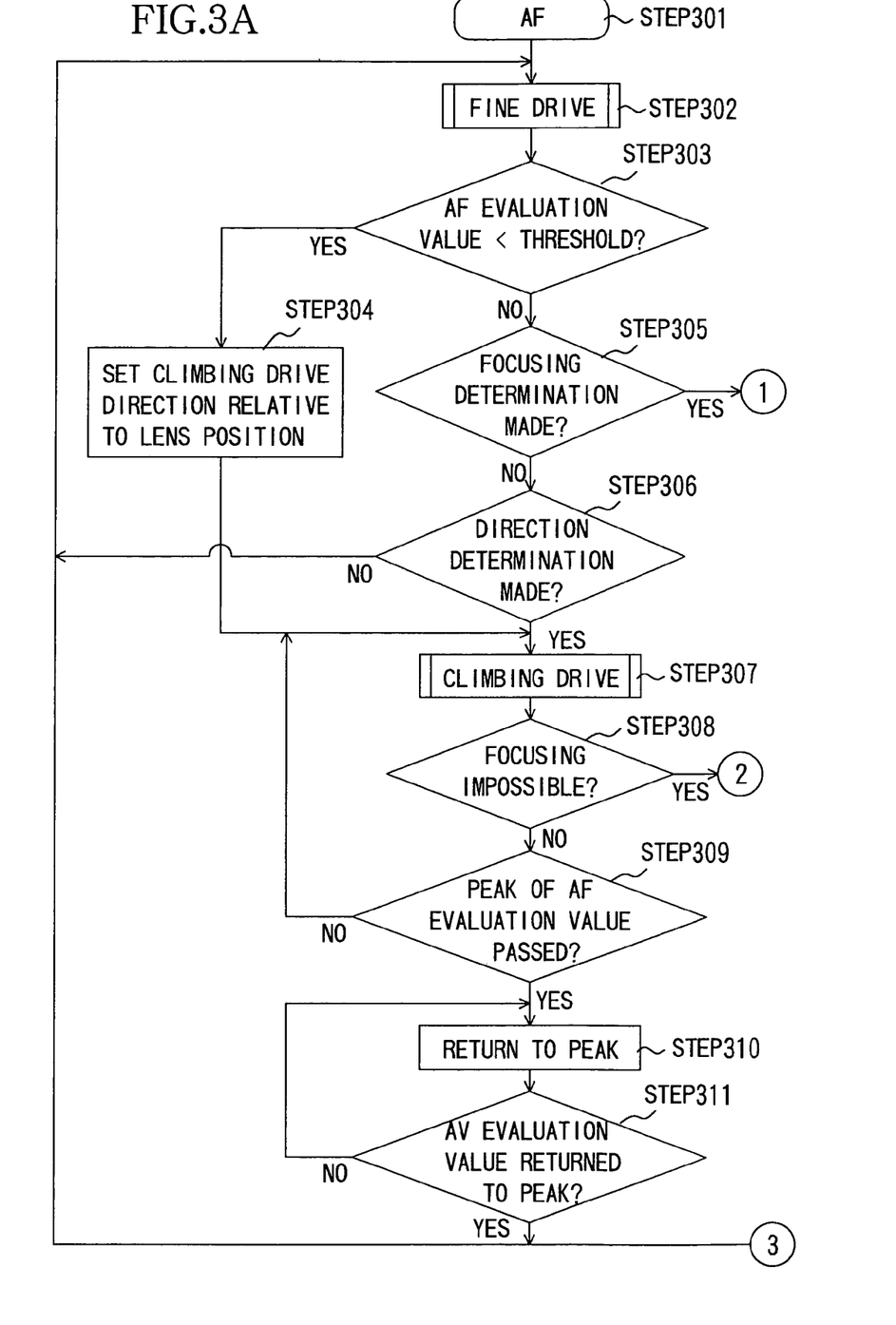
FIG. 3A is a flow chart showing AF control in the video camera of Embodiment 1.

When the power of the video camera is turned on or an AF switch is turned on, the camera/AF microcomputer 114 starts processing at step 301.

Then, at step 302, the camera/AF microcomputer 114 performs fine drive of the focus lens unit 105 to determine whether or not focusing is achieved, and if not, it is determined in which direction of drive an in-focus point (an in-focus position) lies. The fine drive is later described with reference to FIGS. 4A and 4B.

Next, at step 303, the camera/AF microcomputer 114 reads a signal (a focus evaluation signal) representing an AF evaluation value from the AF signal processing circuit 113 and determines whether or not the AF evaluation value is lower than a predetermined threshold. If it is lower, the flow proceeds to step 304, or to step 305 if not.

At step 304, the camera/AF microcomputer 114 immediately proceeds to climbing drive since it is difficult to determine in which direction the focus lens unit 105 should be driven for focusing when the AF evaluation value is low, and the determination of the direction takes a long time to result in poor responsibility. Thus, at step 304, the camera/AF microcomputer 114 sets a direction in which the in-focus position is likely to lie as a climbing direction relative to the current position of the focus lens unit 105 (which can be provided from an output from a position sensor, not shown, for detecting the position of the focus lens unit 105 or a drive pulse count of the focusing motor 111 from a reference position). Specifically, the climbing direction is toward the closest when the current position of the focus lens unit 105 lies on the infinity side relative to the in-focus position, while the climbing direction is toward the infinity when the current position of the focus lens unit 105 lies on the closest side relative to the in-focus position.

The threshold in this case may be determined with reference to the AF evaluation value when an object image is blurred unrecognizably in video signals. Then, the flow proceeds to step 307.

Figure 3B:
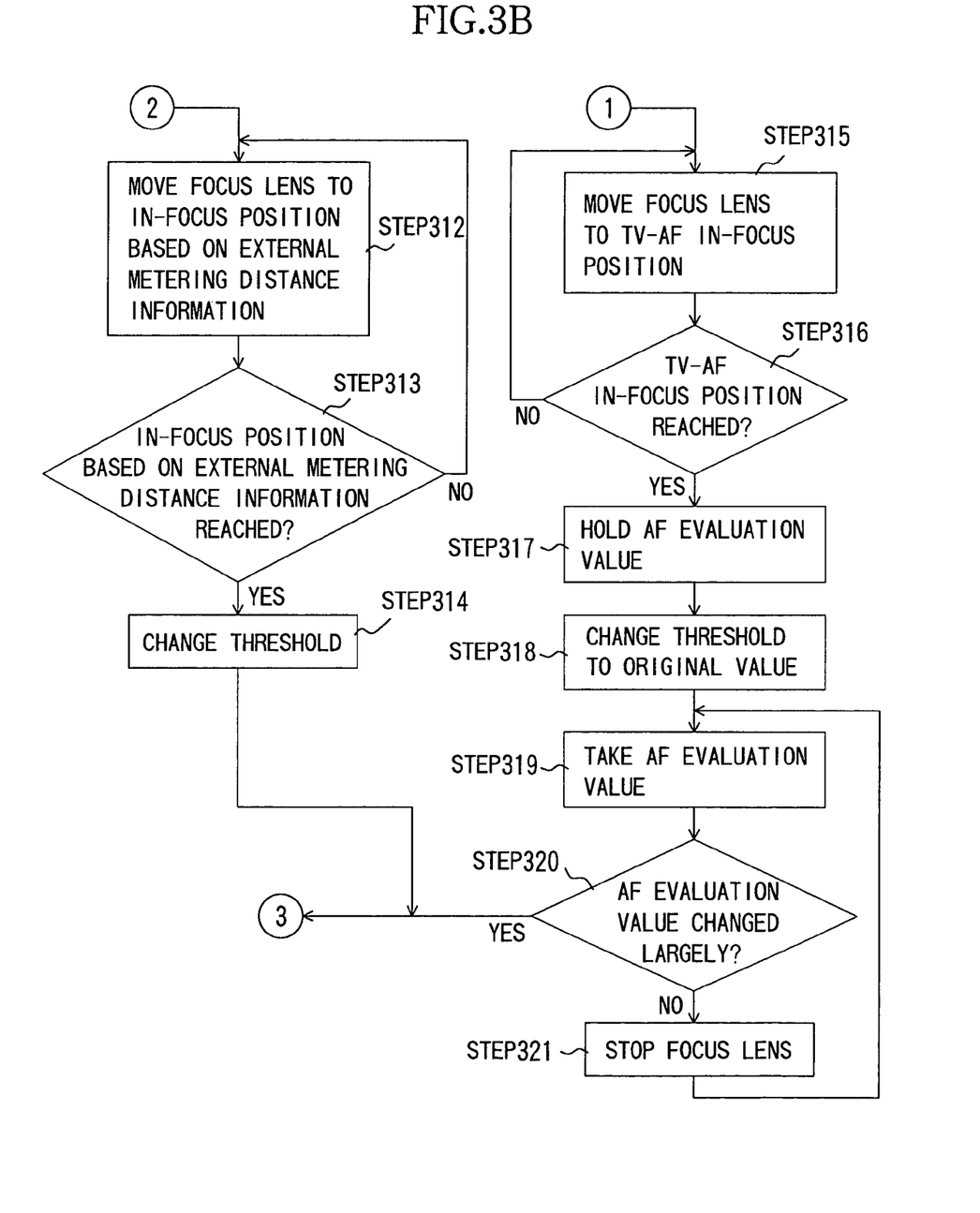
FIG. 3B is a flow chart showing the AF control in the video camera of Embodiment 1.

At step 305, it is determined whether or not the focusing can be determined with the fine drive at step 302. If the focusing can be determined (if a focusing determination flag, later described, is set to one), the flow proceeds to step 315 where focusing/restart determination processing is performed. If the focusing cannot be determined (if the focusing determination flag, later described, is set to zero), the flow proceeds to step 306.

At step 306, it is determined whether or not the direction can be determined with the fine drive at step 302. If the direction can be determined (if a direction determination flag, later described, is set to one), the flow proceeds to step 307 where the climbing drive is performed. If the direction cannot be determined (if the direction determination flag, later described, is set to zero), the flow returns to step 302 to continue the fine drive.

At step 307, the camera/AF microcomputer 114 performs the climbing drive of the focus lens unit 105 at a predetermined speed. The climbing drive is later described with reference to FIG. 6.

At step 308, the camera/AF microcomputer 114 determines whether or not it is determined that focusing cannot be achieved (an in-focus state cannot be provided) during the climbing drive at step 307 under predetermined conditions. If it is determined that the focusing cannot be achieved, the flow proceeds to step 312.

The conditions for determining that focusing cannot be achieved include a failure to determine focusing even after a search over the entire range from the infinity end to the closest end of the focus lens unit 105, and a failure to determine focusing even after a search over a predetermined portion or larger (a part) of the entire range of the focus lens unit 105. Possible reasons for such a failure to determine focusing include few changes in the AF evaluation value provided from a video signal even after the climbing drive of the focus lens unit 105, for example in taking images at low illumination or taking images of an object of low contrast, and a reduced S/N ratio of the AF evaluation value signal.

If it is not determined that focusing cannot be achieved at step 308 (in other words, if it is determined that focusing can be achieved), it is determined at step 309 whether or not the AF evaluation value passes the peak (the maximum value: the value at the in-focus point in FIG. 2) in the climbing drive at step 307. If it is determined that the peak is passed, the flow proceeds to step 310. If it is determined that the peak is not passed, the flow returns to step 307 to continue the climbing drive.

At step 310, the camera/AF microcomputer 114 outputs a control signal to the focusing motor 111 to return the focus lens unit 105 to the position (the in-focus point) at which the AF evaluation value during the climbing drive is at the peak.

At step 311, it is determined whether or not the focus lens unit 105 returns to the position (or near the position) where the AF evaluation value is at the peak. If the focus lens unit 105 returns to the position, the flow returns to step 302 where the fine drive is again performed. If the focus lens unit 105 does not return to the position, the flow returns to step 310 to continue the operation for returning the focus lens unit 105 to the peak.

If it is determined that focusing cannot be achieved at step 308, the flow proceeds to step 312 where the camera/AF microcomputer 114 performs the aforementioned calculations and the like based on the distance information (the external distance measuring information) detected with the signal from the external distance measuring unit 126 and outputs a control signal to the focusing motor 111 to drive the focus lens unit 105 to the in-focus position. In other words, the camera/AF microcomputer 114 drives the focus lens unit 105 with the external metering distance detection method (the second focus control) when focusing cannot be achieved with the TV-AF method (the first focus control).

Next, at step 313, it is determined whether or not the focus lens unit 105 reaches the in-focus position by comparing the information about the in-focus position with the result of the position detection of the focus lens unit 105 (if the drive amount is calculated, it is determined whether or not the focus lens unit 105 is driven corresponding to that drive amount). If the focus lens unit 105 reaches the in-focus position, the flow proceeds to step 314. If the focus lens unit 105 does not reach the in-focus position, the flow returns to step 312 to continue the drive of the focus lens unit 105 to the in-focus position.

At step 314, the camera/AF microcomputer 114 sets a smaller threshold value for use in the second TV-AF to be started thereafter at step 303 than the threshold used in the already performed first TV-AF. This changes control characteristics in the TV-AF as described later.

Specifically, the camera/AF microcomputer 114 performs setting not to perform the climbing drive in the second TV-AF with the processing at step 303, and the flow returns to step 302 where the fine drive of the focus lens unit 105 is performed. In this manner, even when the first TV-AF cannot achieve focusing, the external metering distance measuring detection method is used to move the focus lens unit 105 near the in-focus position, and then the second TV-AF is performed with the control characteristics changed to perform only the fine drive to search for the in-focus position. Thus, the in-focus position is readily detected to allow accurate focusing on a wider variety of objects than in the first TV-AF such as an object at low illumination and an object of low contrast.

Next, description is made for the focusing/restart determination processing from step 315.

When the focusing is determined at step 305, at step 315, the camera/AF microcomputer 114 outputs a control signal to the focusing motor 111 such that the focus lens unit 105 is driven to the in-focus position detected by the fine drive in the TF-AF.

At step 316, it is determined whether or not the focus lens unit 105 reaches the in-focus position. If it reaches the in-focus position, the flow proceeds to step 317. If it does not reaches the in-focus position, the flow returns to step 315.

At step 317, the AF evaluation value at the in-focus position is held in a memory, not shown.

Next, at step 318, the threshold value for use in step 303 is set to the value used in the aforementioned first TV-AF.

Then, at step 319, the (latest) AF evaluation value at this point is taken.

At step 320, the AF evaluation value held at step 317 is compared with the latest AF evaluation value to determine whether the change in the AF evaluation value is larger than a predetermined amount. If the change in the AF evaluation value is larger than the predetermined amount, the flow proceeds to step 302 to again start the fine drive of the focus lens unit 105. If the change in the AF evaluation value is not larger than the predetermined amount, the flow proceeds to step 321.

At step 321, the focus lens unit 105 is stopped, and the flow returns to step 319 to continue the focusing/restart determination processing.

Next, detailed description is made for the fine drive of the focus lens unit performed at step 302 described above with reference to FIGS. 4A and 4B.

Figure 4A:
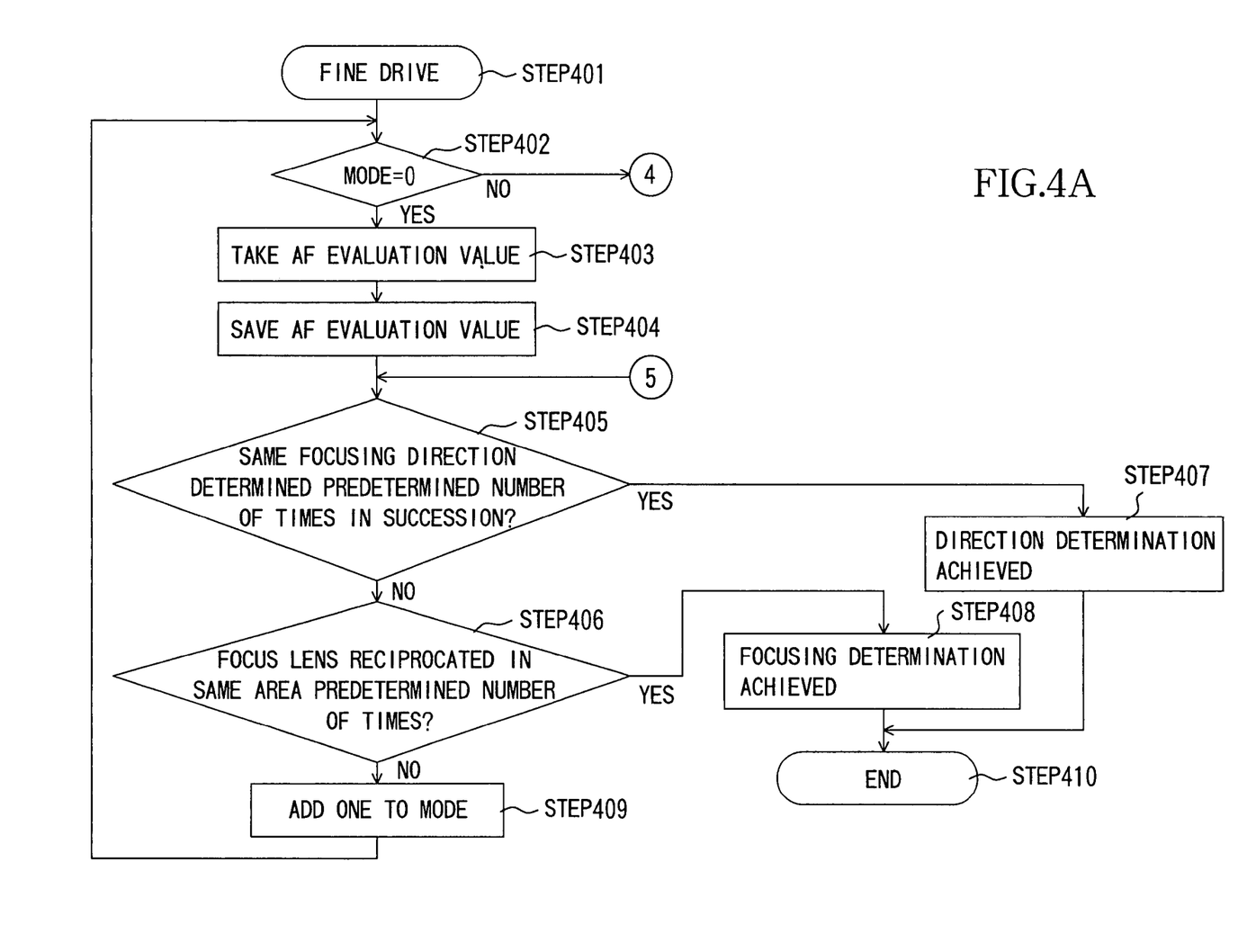
FIG. 4A is a flow chart showing the AF control in the video camera of Embodiment 1.

At step 401, the camera/AF microcomputer 114 starts the processing. Next, at step 402, the camera/AF microcomputer 114 determines whether or not the current mode is Mode zero. If it is Mode zero, the flow proceeds to step 403 to perform processing when it is determined that the focus lens unit 105 lies on the closest side in the fine drive. On the other hand, when it is determined that the focus lens unit 105 lies on the infinite side, the flow proceeds to step 411.

(Processing When the Focus Lens Unit 105 Lies on the Closest Side)

At step 403, the camera/AF microcomputer 114 takes the AF evaluation value from the AF signal processing circuit 113. The AF evaluation value is based on a video signal formed from electric charge accumulated in the image-pickup device 106 when the focus lens unit 105 is located on the infinite side in Mode 2, later described.

Next, at step 404, the AF evaluation value taken at step 403 is saved as an infinite side AF evaluation value in a memory, not shown.

At step 405, it is determined whether or not the same direction is determined as the focusing direction a predetermined number of times in succession. If so, the flow proceeds to step 407, or if not, the flow proceeds to step 406.

At step 406, it is determined whether or not the focus lens unit 105 repeats the reciprocation in the same area (near the in-focus position) a predetermined number of times. If so, the flow proceeds to step 408, or if not, the flow proceeds to step 409 where one is added to the value of Mode (Mode returns to zero when the addition results in four or more) before the flow proceeds to step 402.

At step 407, the direction can be determined (the direction determination flag is set to one), so that the flow proceeds to step 410 where the processing is ended to proceed to the climbing drive.

At step 408, the focusing can be determined (the focusing determination flag is set to one), so that the flow proceeds to step 410 where the processing is ended to proceed to the restart determination.

Figure 4B:
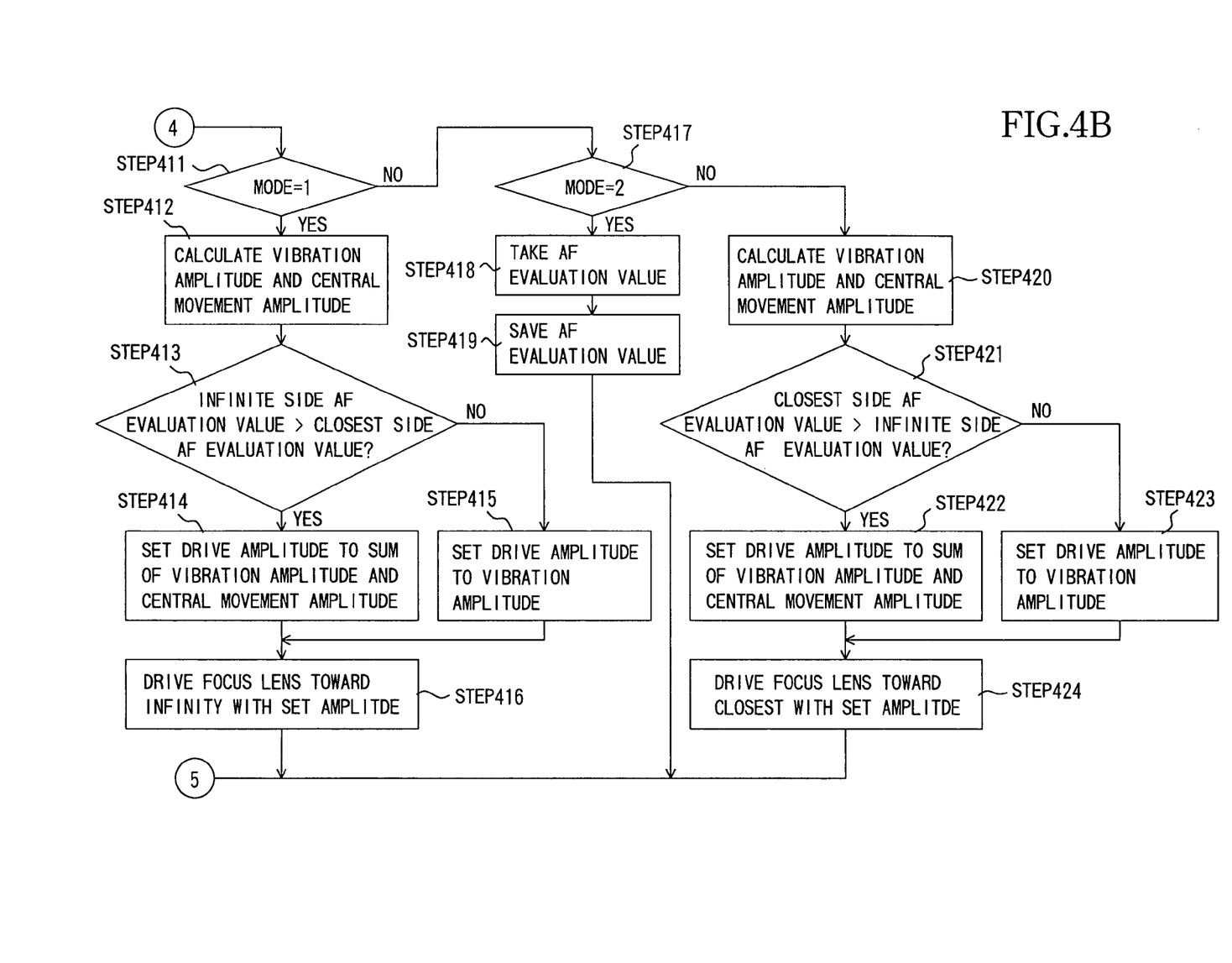
FIG. 4B is a flow chart showing the AF control in the video camera of Embodiment 1.

At step 411, it is determined whether or not the current mode is Mode one. If it is Mode one, the flow proceeds to step 412 to perform processing for driving the focus lens unit 105 toward the infinite side, later described. If it is not Mode one, the flow proceeds to step 417.

(Processing of Driving the Focus Lens Unit 105 Toward the Infinite Side)

At step 412, the camera/AF microcomputer 114 calculates a vibration amplitude and a central movement amplitude in the fine drive. Although not described herein in detail, the amplitude is set typically with reference to the depth of focus such that a small amplitude is set when the depth of focus is small, while a large amplitude is set when the depth of focus is large.

At step 413, the infinite side AF evaluation value in Mode 0 described above is compared with a closest side AF evaluation value in Mode 3 later described. If the infinite side AF evaluation value is larger than the closest side AF evaluation value, the flow proceeds to step 414. If the infinite side AF evaluation value is equal to or smaller than the closest side AF evaluation vale, the flow proceeds to step 415.

At step 414, the drive amplitude is set to the sum of the vibration amplitude and the central movement amplitude.

At step 415, the drive amplitude is set to the vibration amplitude.

At step 416, the camera/AF microcomputer 114 outputs a control signal to the focusing motor 111 such that the focus lens unit 105 is driven toward the infinite direction with the amplitude determined at step 414 or step 415. Then, the flow proceeds to the processing at step 405 and afterward as described above.

At step 417, it is determined whether or not the current mode is Mode 2. If it is Mode 2, the flow proceeds to step 408 to perform processing when it is determined that the focus lens unit 105 lies on the infinite side in the fine drive, later described. On the other hand, if it is determined that the focus lens unit 105 is to be driven toward the closest side, the flow proceeds to step 420.

(Processing When the Focus Lens Unit 105 Lies on the Infinite Side)

At step 418, the camera/AF microcomputer 114 takes the AF evaluation value from the AF signal processing circuit 113. The AF evaluation value is based on a video signal formed from electric charge accumulated in the image-pickup device 106 when the focus lens unit 105 lies on the closest side in Mode zero as described above.

At step 419, the AF evaluation value taken at step 418 is held as a closest side AF evaluation value in a memory, not shown. Then, the flow proceeds to the processing at step 405 and afterward described above.

(Processing of Driving the Focus Lens Unit 105 Toward the Closest Side)

At step 420, the camera/AF microcomputer 114 calculates a vibration amplitude and a central movement amplitude in the fine drive of the focus lens unit 105. Although not described herein in detail, the amplitude is set typically with reference to the depth of focus such that a small amplitude is set when the depth of focus is small, while a large amplitude is set when the depth of focus is large.

At step 421, the infinite side AF evaluation value in Mode 0 described above is compared with the closest side AF evaluation value in Mode 3 described above. If the closest side AF evaluation value is larger than the infinite side AF evaluation value, the flow proceeds to step 422. If the closest side AF evaluation value is equal to or smaller than the infinite side AF evaluation vale, the flow proceeds to step 423.

At step 422, the drive amplitude is set to the sum of the vibration amplitude and the central movement amplitude.

At step 423, the drive amplitude is set to the vibration amplitude.

At step 424, the camera/AF microcomputer 114 outputs a control signal to the focusing motor 111 such that the focus lens unit 105 is driven toward the closest with the amplitude determined at step 422 or step 423. Then, the flow proceeds to the processing at step 405 and afterward as described above.

Figure 5:
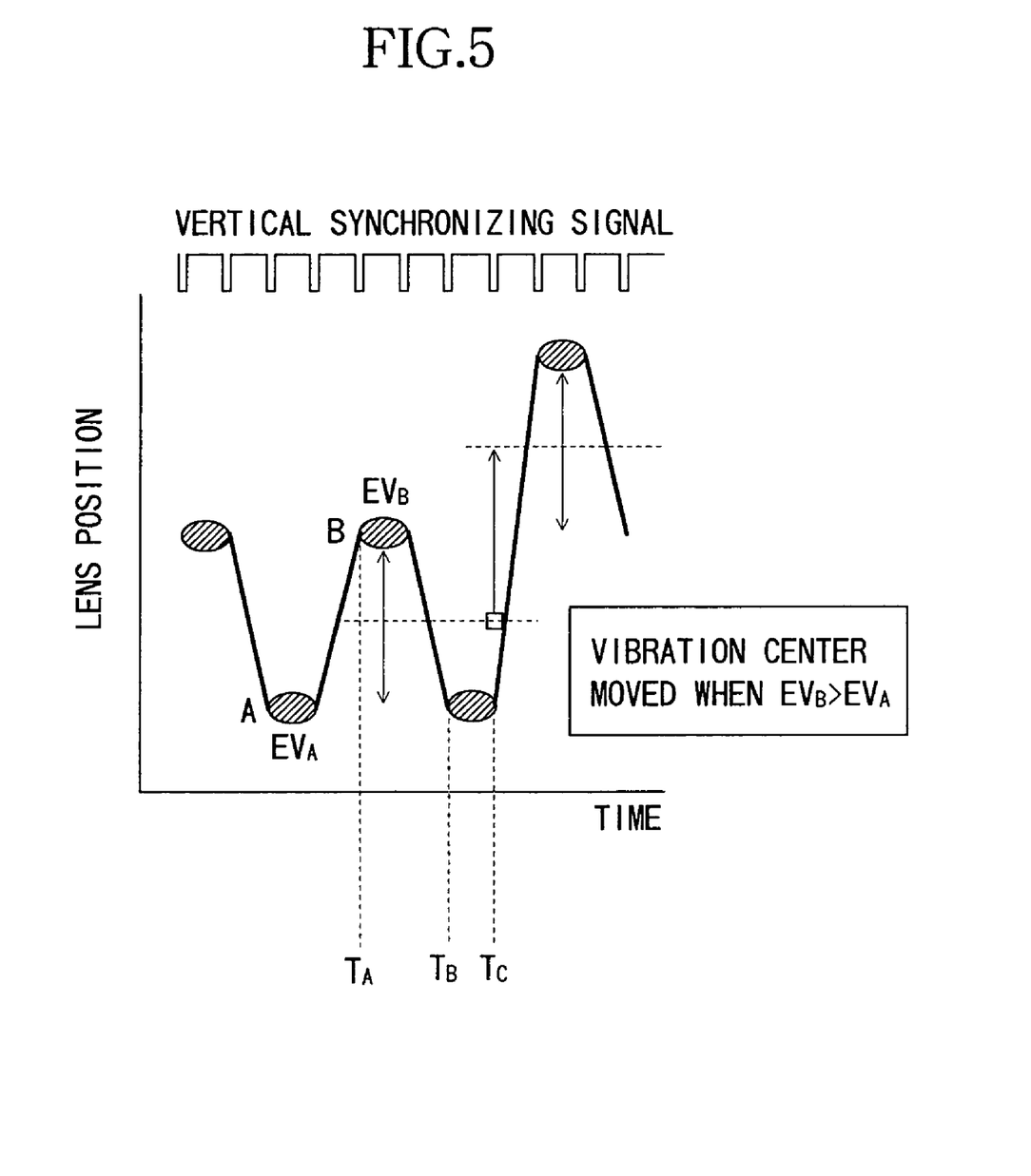
FIG. 5 is a graph schematically showing fine drive of the focus lens unit in the AF control.

FIG. 5 shows the aforementioned focus lens operation over time. The horizontal axis represents time, while the vertical axis represents the position of the focus lens unit 105. In a pulse waveform shown in an upper portion of FIG. 5, downward edges represent a vertical synchronizing signal for video signals.

In FIG. 5, an AF evaluation value $EV_A$ for electric charge (shown by a shaded ellipse) accumulated in the image-pickup device 106 during a period A is taken at a time $T_A$, while an AF evaluation value $EV_B$ for electric charge (shown by a shaded ellipse) accumulated in the image-pickup device 106 for a period B is taken at a time $T_B$. At a time $T_C$, the AF evaluation values $EV_A$ and $EV_B$ are compared. If $EV_B$ is larger than $EV_A$, the vibration center is moved (the drive amplitude is set to the sum of the vibration amplitude and the central movement amplitude). On the other hand, if the $EV_A$ is larger than $EV_B$, the vibration center is not moved (the drive amplitude is set to the vibration amplitude).

Figure 6:
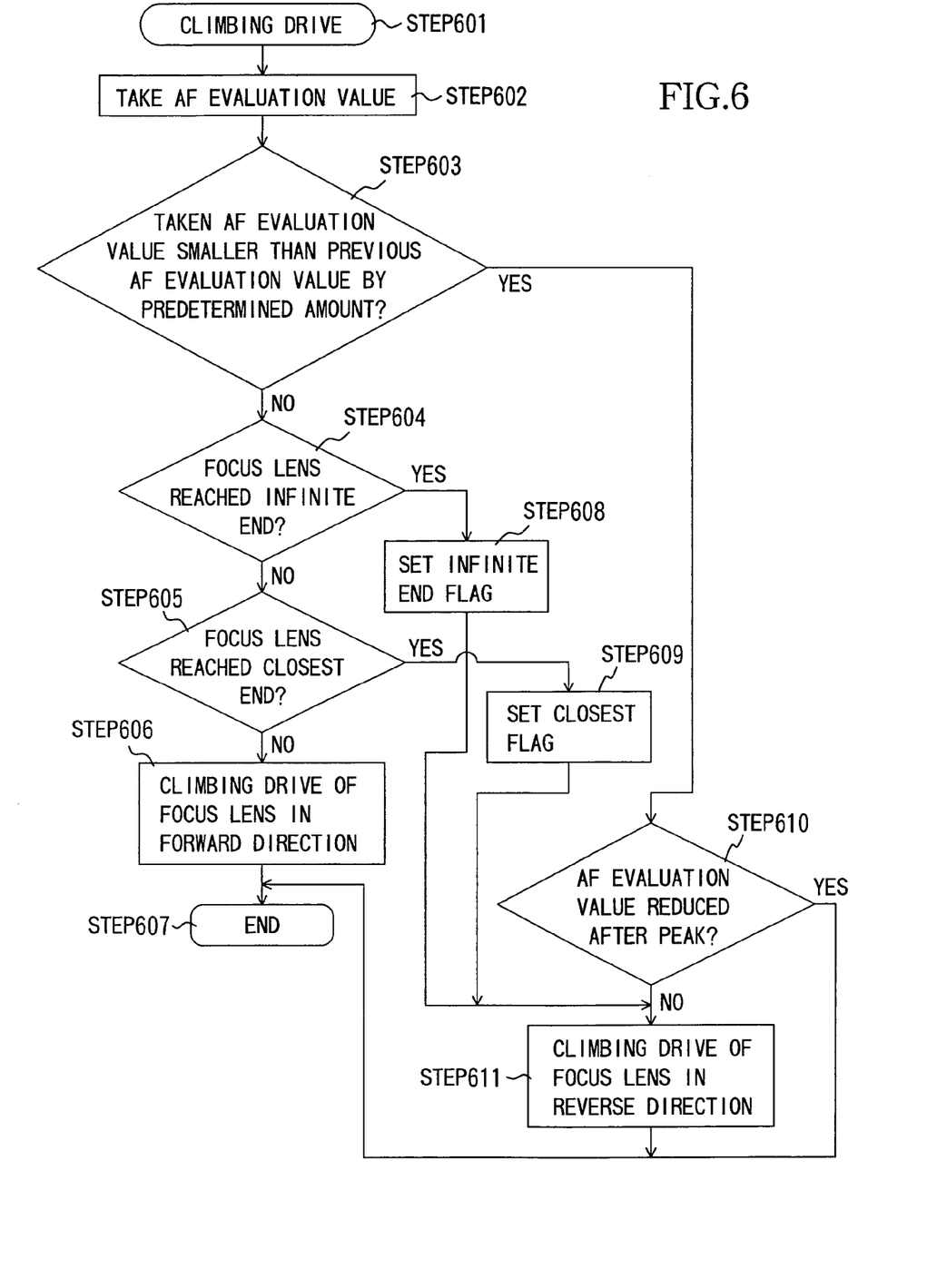
FIG. 6 is a flow chart showing the AF control in the video camera of Embodiment 1.

Next, the climbing drive of the focus lens unit 105 is described with reference to FIG. 6.

At step 601, the camera/AF microcomputer 114 starts the processing.

At step 602, the camera/AF microcomputer 114 takes the AF evaluation value from the AF signal processing circuit 113.

Next, at step 603, it is determined whether or not the AF evaluation value taken at step 602 is smaller than the previous AF evaluation value by a predetermined amount. If not, the flow proceeds to step 604, or to step 610 if it is smaller. The predetermined amount corresponds to a value which is determined in consideration of the S/N ratio of the AF evaluation value and is equal to or larger than an amplitude of a variation in the AF evaluation value when. an object is fixed and the focus lens unit 105 is positioned fixedly. Otherwise, the climbing drive cannot be performed in a correct direction due to the influence of the variation in the AF evaluation value.

At step 604, it is determined whether or not the focus lens unit 105 reaches the infinite end. The infinite end refers to the position nearest to the infinite in the stroke of the focus lens unit 105 defined in design. If it reaches the infinite end, the flow proceeds to step 608. If not, the flow proceeds to step 605.

At step 605, it is determined whether or not the focus lens unit 105 reaches the closest end. The closest end refers to the position nearest to the closest in the stroke of the focus lens unit 105 defined in design. If it reaches the closest end, the flow proceeds to step 609. If not, the flow proceeds to step 606.

At step 608, the flag indicating the infinite end is set. At step 609, the flow indicating the closest end is set. The flow proceeds to step 611 from both of steps 608 and 609. At step 611, the camera/AF microcomputer 114 outputs a control signal to the focusing motor 111 such that the focus lens unit 105 continues the climbing drive in the direction opposite to the end shown by the aforementioned flag.

At step 606, the camera/AF microcomputer 114 outputs a control signal to the focusing motor 111 such that the climbing drive of the focus lens unit 105 is performed at a predetermined speed in the same direction (the forward direction) as in the previous drive. Then, the flow proceeds to step 607 to end the current processing.

At step 610, it is determined whether or not the AF evaluation value is reduced passing through the peak. If it is not determined that the AF evaluation value is reduced passing through the peak, the flow proceeds to step 611. If the AF evaluation value is reduced passing through the peak, the flow proceeds to step 607 where the processing is ended to proceed to the fine drive.

At step 611, the camera/AF microcomputer 114 outputs a control signal to the focusing motor 111 such that the climbing drive of the focus lens unit 105 is performed at a predetermined constant speed in the direction opposite to the direction in the previous drive. Then, the flow proceeds to step 607 to end the current processing.

Figure 7:
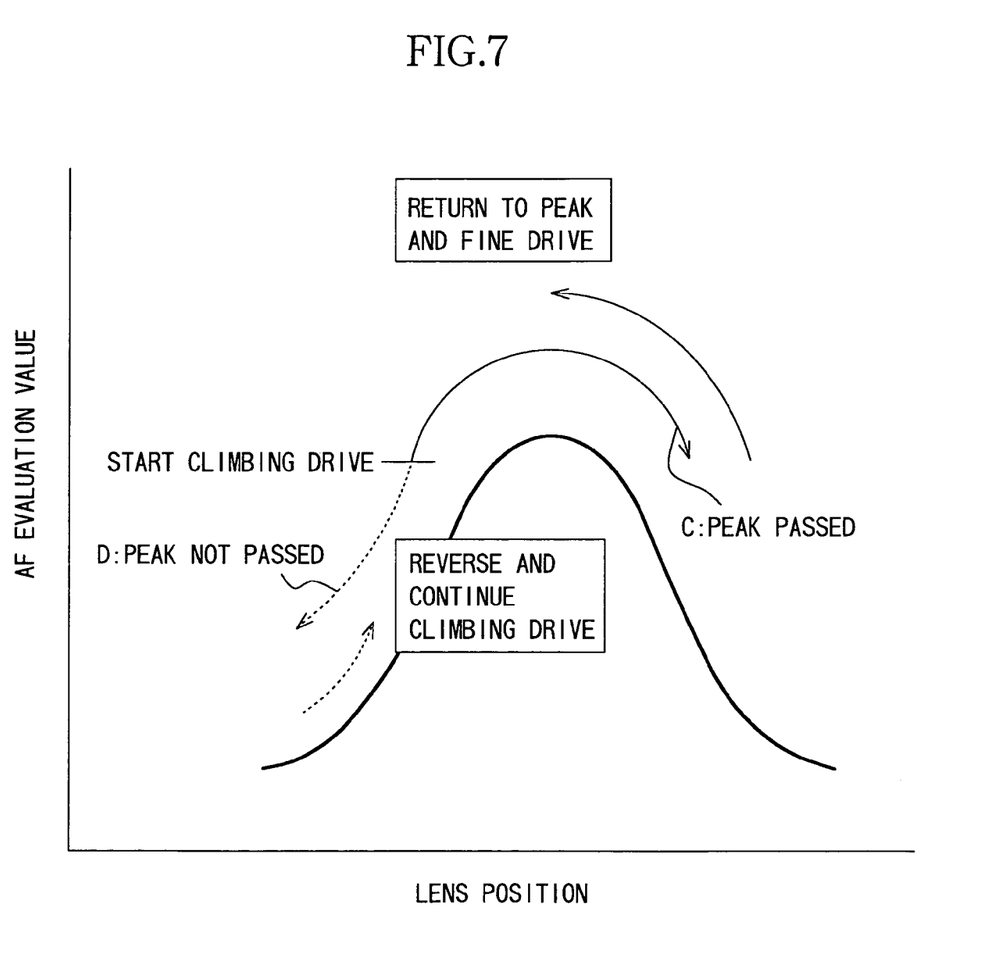
FIG. 7 is a graph schematically showing climbing drive of the focus lens unit in the AF control.

FIG. 7 shows the movement of the focus lens unit 105 in the climbing drive described above. The vertical axis represents the AF evaluation value, while the horizontal axis represents the position of the focus lens unit 105. An arrow C shows the case where the AF evaluation value is reduced passing through the peak, in which case it is determined that the in-focus point is passed, so that the climbing drive is ended to proceed to the fine drive. On the other hand, in the case indicated by an arrow D, the AF evaluation value does not pass the peak and is reduced, so that it is determined that the direction is wrong and the drive direction is reversed to continue the climbing drive.

Embodiment 2

Figure 8:
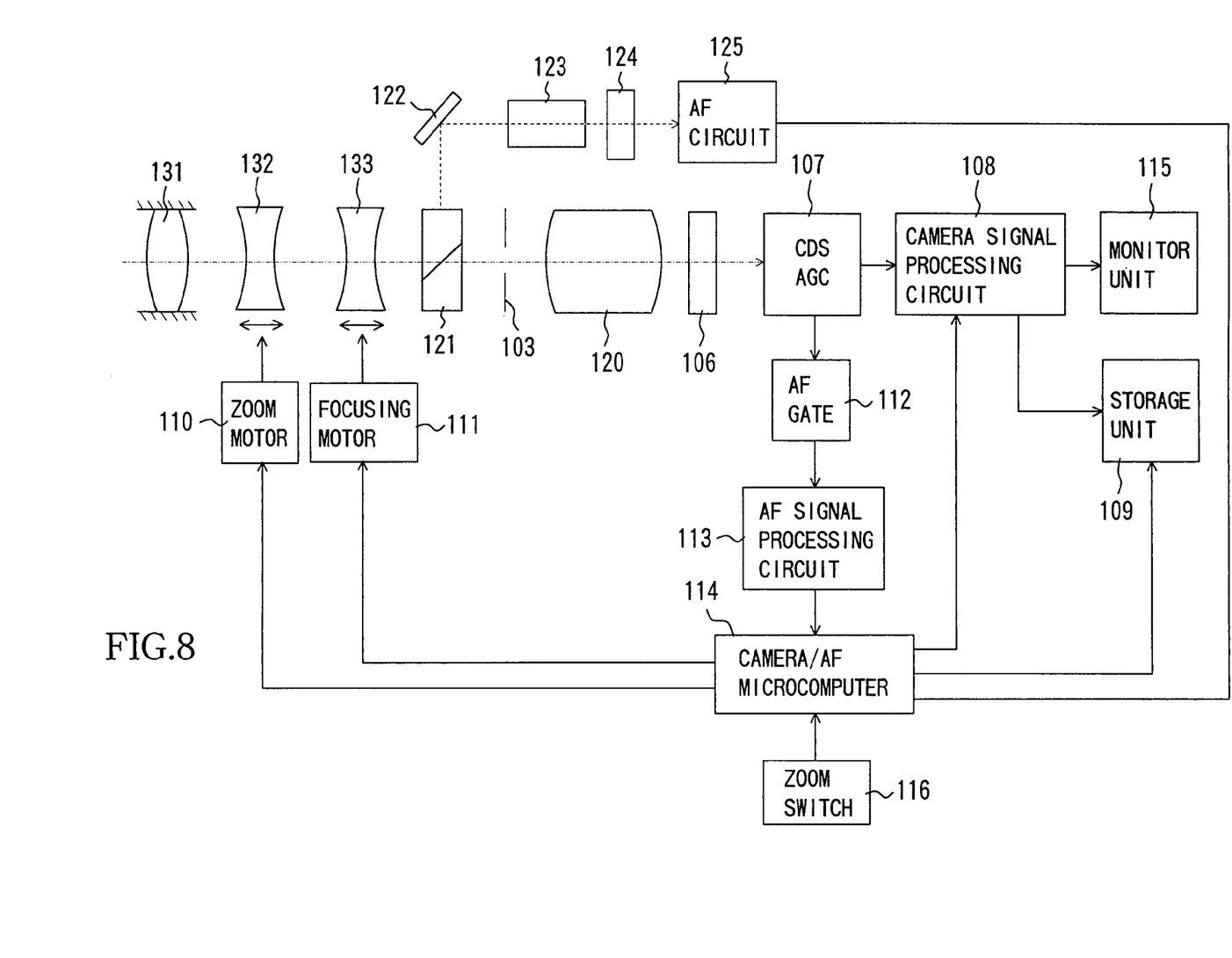
FIG. 8 is a block diagram showing the structure of a video camera which is Embodiment 2 of the present invention.

FIG. 8 is a block diagram showing the system structure of a video camera (an image-taking apparatus) which is Embodiment 2 of the present invention. In Embodiment 2, components identical to those in Embodiment 1 are designated with the same reference numerals as those in Embodiment 1 and description thereof is omitted.

Embodiment 1 has been described for the case where the focus control with the external distance detection method by using the external distance measuring unit 126 is employed as the second focus control. However, in Embodiment 2, description is made for the use of focus control with the TTL (Through The Lens) phase difference detection method.

In FIG. 8, reference numeral 131 shows a fixed lens unit which is stationary, reference numeral 132 shows a lens unit (hereinafter referred to as a zoom lens unit) which provides variable magnification, and reference numeral 133 shows a lens unit (hereinafter referred to as a focus lens unit) which has both of a focus adjusting function and a so-called compensator function of correcting movements of an image surface due to varied magnification. Reference numeral 120 shows an image-forming lens unit disposed between a stop 103 and an image-pickup device 106. An image-taking optical system constituted by these lens units is a rear focus optical system formed of the four lens units having a positive, a negative, a negative, a positive optical powers in order from an object side (the left side in FIG. 8). It should be noted that, while each lens unit is shown as it is formed of a single lens, each lens unit may actually be formed of a single lens or a plurality of lenses.

Reference numeral 121 shows a half prism which is disposed between the focus lens unit 133 and the stop 103 and splits light for auto-focusing. Reference numeral 122 shows a submirror which reflects a luminous flux from the half prism 121, reference numeral 123 shows an AF image-forming lens which forms a luminous flux from the submirror 121 into an image. Reference numeral 125 shows an AF circuit (a second detector) which has a line sensor (AF sensor) 124 for achieving the phase difference detection method.

A camera/AF microcomputer 114 detects a defocus amount and a defocus direction of the image-taking optical system from an output of the AF sensor 124 through the AF circuit 125.

In the video camera of such a structure, the stop 103 is operating while moving images are taken, so that the half prism 121 before the stop 103 needs to split a luminous flux incident on the image-taking optical system.

Figure 9A:
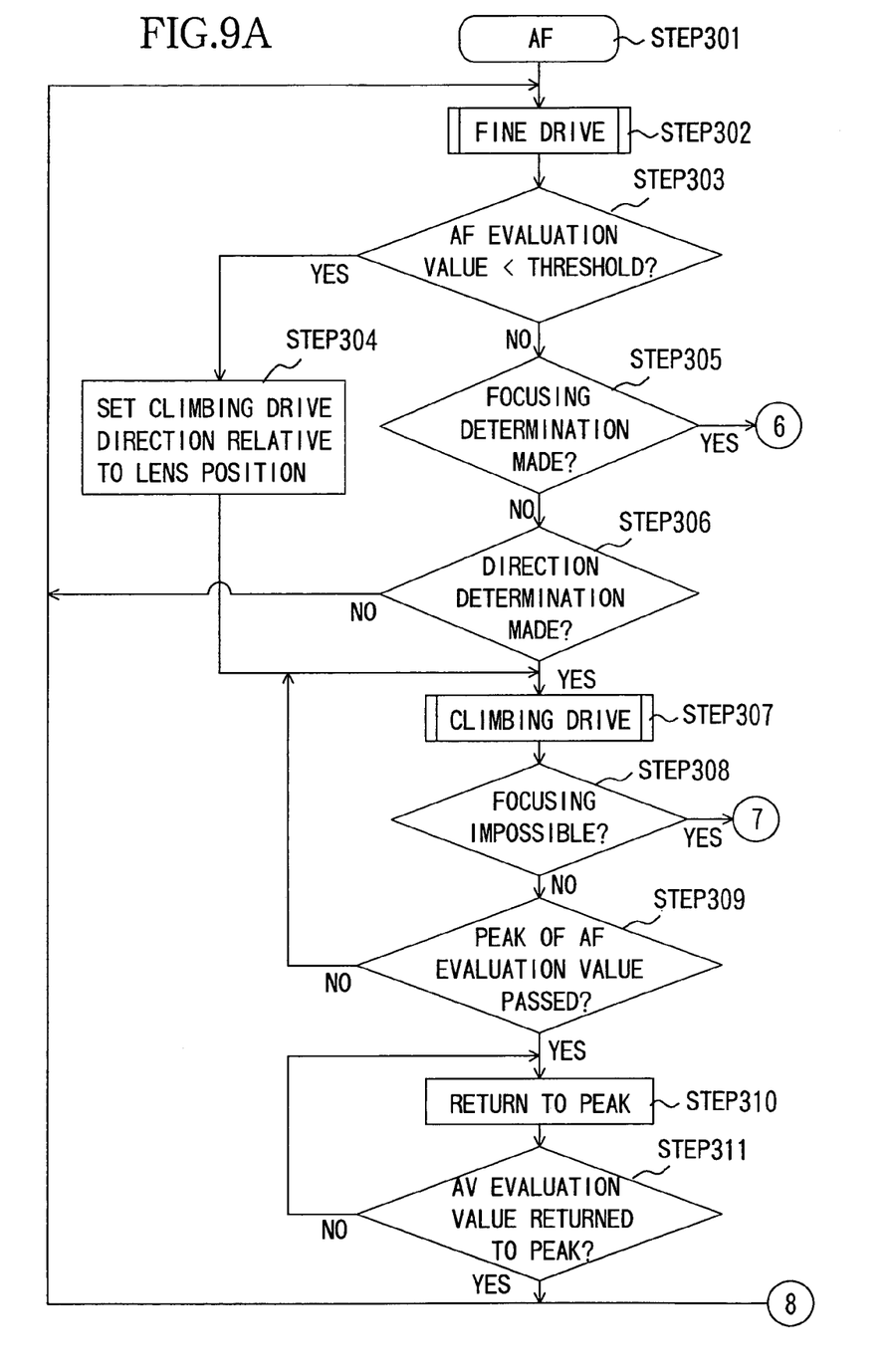
FIG. 9A is a flow chart showing AF control in the video camera of Embodiment 2.
Figure 9B:
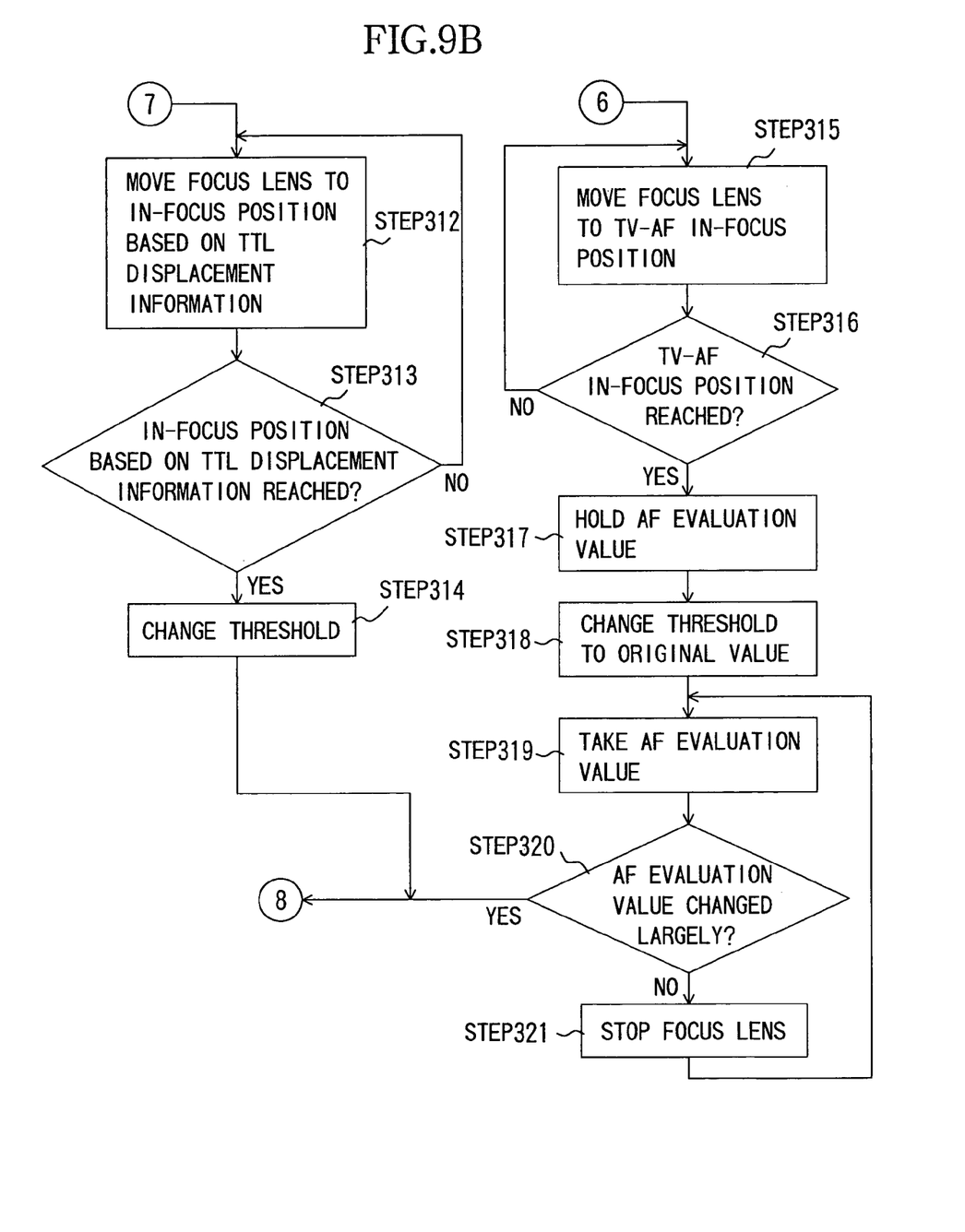
FIG. 9B is a flow chart showing the AF control in the video camera of Embodiment 2.

In Embodiment 2, an algorithm for AF control substantially similar to that described in Embodiment 1 can be applied. FIGS. 9A and 9B show a flow chart which describes characteristics of Embodiment 2.

The flow chart corresponds to the flow chart in FIGS. 3A and 3B described in Embodiment 1, and steps identical to those in FIGS. 3A and 3B are designated with the same reference numerals and description thereof is omitted. The flow chart in FIGS. 9A and 9B differs from that in FIGS. 3A and 3B only in that the information about the distance to the object used at steps 312 and 313 in FIGS. 3A and 3B is replaced with the aforementioned defocus amount and the defocus information (TTL displacement information) at steps 901 and 902. Embodiment 2 can provide the effects similar to those in Embodiment 1.

As described above, in Embodiments 1 and 2, only when focusing cannot be achieved (an in-focus state cannot be provided) with the TV-AF method (the first focus control), the AF method (the second focus control such as the external distance detection method and the TTL phase difference detection method) other than the TV-AF method is used to achieve focusing. Thus, it is possible to reduce the possibility that the focus lens unit 105 passes the true in-focus position which should be detected in the first focus control when the focus lens unit 105 is driven for focusing in the second focus control. In addition, when focusing cannot be achieved with the first focus control, the second focus control is used to achieve focusing, so that focusing can be achieved on a wider variety of objects as compared with the case where only the first focus control can be used.

Especially, the use of the detection of the distance to the object (for example the external metering distance detection method) as in Embodiment 1 allows focusing on an even wider variety of objects as compared with the method (for example, the TTL phase difference detection method) which relies on contrast of an image of light received in an light receiving sensor (or an image-pickup device).

After focusing is achieved (the focus lens unit 105 is driven near the true in-focus position) using the second focus control, the in-focus position is searched for in the first focus control with the changed control characteristics to allow accurate focusing on a wide variety of objects.

Specifically, the first focus control for the second time is performed after the second focus control, so that the effect of accurate focusing can be expected since the focus evaluation signal is changed from that in the first focus control performed for the first time. Particularly, when the first focus control is performed for the second time, the control characteristics are changed from those in the first focus control for the first time, thereby making it possible to further increase the possibility that accurate focusing can be achieved with the first focus control for the second time.

While preferred embodiments have been described, it is to be understood that modification and variation of the present invention may be made without departing from the scope of the following claims.

This application claims priority from Japanese Patent Application No. 2003-317340 filed on Sep. 9, 2003, which is hereby incorporated by reference herein.

What is claimed is:

1. An image-taking apparatus comprising:
   an image-pickup device which photoelectrically converts an object image formed by an image-taking optical system including a focus lens;
   a first detector which outputs a first signal representing a focus state of the image-taking optical system based on a predetermined-frequency component of an output signal of the image-pickup device;
   a second detector which outputs a second signal corresponding to a defocus amount of the image-taking optical system based on phase difference of two images; and
   a controller which performs a first focus control for controlling drive of the focus lens such that an in-focus position of the focus lens is searched for based on the first signal and a second focus control for controlling drive of the focus lens such that one of an in-focus position and a drive amount of the focus lens is determined based on the second signal,
   wherein the controller selects the first focus control in priority over the second focus control in a case where a value of the first signal is larger than a predetermined value, and
   wherein, in a case where the second focus control is selected, the controller changes the predetermined value into a value smaller than that at the time of the selection of the second focus control.

2. The image-taking apparatus according to claim 1, wherein the controller performs the second focus control after selecting the second focus control and repeats selection of the first and second focus controls based on the changed predetermined value.

3. A method of focus control for an image-taking apparatus including an image-pickup device which photoelectrically converts an object image formed by an image-taking optical system including a focus lens, the method comprising:
   a step of producing a first signal representing a focus state of the image-taking optical system based on a predetermined-frequency component of an output signal of the image-pickup device;
   a step of producing a second signal corresponding to a defocus amount of the image-taking optical system based on phase difference of two images;
   a first focusing step of performing a first focus control for controlling drive of the focus lens such that an in-focus position of the focus lens is searched for based on the first signal;
   a second focusing step of performing a second focus control for controlling drive of the focus lens such that one of an in-focus position and a drive amount of the focus lens is determined based on the second signal;
   a step of selecting the first focusing step in priority over the second focusing step in a case where a value of the first signal is larger than a predetermined value; and
   a step of changing the predetermined value into a value smaller than that at the time of the selection of the second focusing step in a case where the second focusing step is selected.

4. The method according to claim 3, further comprising:
   a step of performing the second focusing step after the second focusing step is selected; and
   a step of selecting the first and second focusing steps based on the changed predetermined value.

5. A microcomputer operating in accordance with a processing program for use in an image-taking apparatus including an image-pickup device which photoelectrically converts an object image formed by an image-taking optical system including a focus lens, wherein the microcomputer operates in accordance with the processing program to effect a method comprising:
   a step of producing a first signal representing a focus state of the image-taking optical system based on a predetermined-frequency component of an output signal of the image-pickup device;
   a step of producing a second signal corresponding to a defocus amount of the image-taking optical system based on phase difference of two images;
   a first focusing step of performing a first focus control for controlling drive of the focus lens such that an in-focus position of the focus lens is searched for based on the first signal;
   a second focusing step of performing a second focus control for controlling drive of the focus lens such that one of an in-focus position and a drive amount of the focus lens is determined based on the second signal;
   a step of selecting the first focusing step in priority over the second focusing step in a case where a value of the first signal is larger than a predetermined value; and
   a step of changing the predetermined value into a value smaller than that at the time of the selection of the second focusing step in a case where the second focusing step is selected.

* * * * *